(12) United States Patent
Rowan et al.

(10) Patent No.: US 10,913,837 B2
(45) Date of Patent: Feb. 9, 2021

(54) NANO-EMULSION AND NANO-LATEXES WITH FUNCTIONALIZED CELLULOSE NANOCRYSTALS

(71) Applicant: CASE WESTERN RESERVE UNIVERSITY, Cleveland, OH (US)

(72) Inventors: Stuart J. Rowan, Chicago, IL (US); Yefei Zhang, Willoughby, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 0 days.

(21) Appl. No.: 15/770,880

(22) PCT Filed: Nov. 4, 2016

(86) PCT No.: PCT/US2016/060434
§ 371 (c)(1),
(2) Date: Apr. 25, 2018

(87) PCT Pub. No.: WO2017/079497
PCT Pub. Date: May 11, 2017

(65) Prior Publication Data
US 2018/0319958 A1 Nov. 8, 2018

Related U.S. Application Data

(60) Provisional application No. 62/252,029, filed on Nov. 6, 2015.

(51) Int. Cl.
| | | |
|---|---|---|
| C08L 1/04 | (2006.01) | |
| C08B 11/12 | (2006.01) | |
| C08B 15/08 | (2006.01) | |
| C08B 15/00 | (2006.01) | |

(Continued)

(52) U.S. Cl.
CPC ............... *C08L 1/04* (2013.01); *C08B 11/10* (2013.01); *C08B 11/12* (2013.01); *C08B 15/00* (2013.01);

(Continued)

(58) Field of Classification Search
None
See application file for complete search history.

(56) References Cited

U.S. PATENT DOCUMENTS

| | | | |
|---|---|---|---|
| 2013/0122071 A1* | 5/2013 | Cathala | C08F 4/12 424/401 |
| 2014/0083416 A1 | 3/2014 | Nuopponen et al. | |
| 2015/0368367 A1 | 12/2015 | Hu et al. | |

OTHER PUBLICATIONS

Elmabrouk et al, preparation of poly(styrene co hexylacrylate)/cellulose whiskers nanocomposites via miniemulsion polymerization, journal of applied polymer science, vol. 114, pp. 2946-2955 (Year: 2009).*

(Continued)

*Primary Examiner* — Stefanie J Cohen
(74) *Attorney, Agent, or Firm* — Hudak, Shunk & Farine Co. LPA

(57) ABSTRACT

Nano-emulsions and nano-latexes comprising functionalized cellulose nanocrystals (CNCs) as a surfactant that impacts the stability and size of the emulsion droplets of oil-in water emulsions. Stable emulsions can be accessed by adding a desired organic, non-water soluble molecule as the oil phase to an aqueous CNC suspension followed by agitation. Depending on the functionalization of the CNCs, their hydrophilic/hydrophobic balance can be modified, which allows the ability to control the stability and droplet size of the emulsion. Methods for producing nano-emulsions and nano-latexes, when the oil phase contains a polymerizable monomer, are disclosed.

12 Claims, 21 Drawing Sheets a)

b)

(51) Int. Cl.
    *C08F 2/32*     (2006.01)
    *C08F 2/22*     (2006.01)
    *C08F 2/30*     (2006.01)
    *C08F 12/08*     (2006.01)
    *C08B 11/10*     (2006.01)
    *C08F 2/24*     (2006.01)
    *C08L 9/10*     (2006.01)
    *B82Y 30/00*     (2011.01)
    *C08F 220/18*     (2006.01)
    *B82Y 40/00*     (2011.01)
    *C08F 212/08*     (2006.01)

(52) U.S. Cl.
CPC ................ *C08B 15/08* (2013.01); *C08F 2/22* (2013.01); *C08F 2/24* (2013.01); *C08F 2/30* (2013.01); *C08F 2/32* (2013.01); *C08F 12/08* (2013.01); *C08L 9/10* (2013.01); *B82Y 30/00* (2013.01); *B82Y 40/00* (2013.01); *C08F 212/08* (2013.01); *C08F 220/18* (2013.01); *C08F 220/1806* (2020.02)

(56) References Cited

OTHER PUBLICATIONS

Elmabrouk et al, preparation of poly(styrene co hexylacrylate)/cellulose whiskers nanocomposite via miniemulsion polymerization, journal of applied science, vol. 114, pp. 2945-2955 (Year: 2009).*

Visanko et al, Amphiphilic Cellulose Nanocrystals from Acid-Free Oxidative Treatment: Physicochemical Characteristics and Use as an Oil-Water Stabilizer, biomacromolecules, 15, 2769-2775, Jun. 19, 2014 (Year: 2014).*

Sirvio et al, Amino-modified cellulose nanocrystals with adjustable hydrophobicity from combined regioselective oxidation and reductive amination, carbohydrate polymers, 136, 581-587, Sep. 2015 (Year: 2015).*

Mabrouk et al, Synthesis and characterization of cellulose whiskers/polymer nanocompositedispersion by mini-emulsion polymerization, journal of colloid and interface science, 363, pp. 129-136 (Year: 2011).*

Elmabrouk et al., "Preparation of poly(styrne-co-hexylacrylate)/cellulose whiskers nanocomposites via miniemulsion polymerziation" J. Appl. Polym. sci., 2009, pp. 2946-2948, vol. 114, No. 5, Wiley Periodicals, Inc.

George et al., "Cellulose nanocrystals: synthesis, functional properties, and applications" Nanotechnol, sci. Appl., Nov. 4, 2015, pp. 45-54, vol. 8, Dove Medical Press Limited.

Ojala et al., "Nanoparticle emulsifiers based on bifunctionalized cellulose nanocrystals as marine diesel oil-water emulsion stabilizers" Chemical Engineering Journal, Dec. 11, 2015, pp. 311-320, vol. 288, Elsevier.

\* cited by examiner

Figure 1(a)-(d)

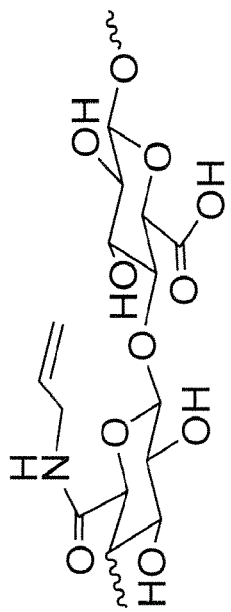
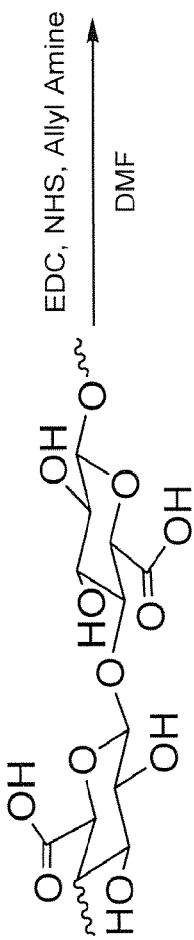
Figure 5

NANO-EMULSION AND NANO-LATEXES WITH FUNCTIONALIZED CELLULOSE NANOCRYSTALS

FIELD OF THE INVENTION

The present invention relates to nano-emulsions and nano-latexes comprising functionalized cellulose nanocrystals (CNCs) as a surfactant that impacts the stability and size of the emulsion droplets of oil-in water emulsions. Stable emulsions can be accessed by adding a desired organic, non-water soluble molecule as the oil phase to an aqueous CNC suspension followed by agitation. Depending on the functionalization of the CNCs, their hydrophilic/hydrophobic balance can be modified, which allows the ability to control the stability and droplet size of the emulsion. Methods for producing nano-emulsions and nano-latexes, when the oil phase contains a polymerizable monomer, are disclosed.

BACKGROUND OF THE INVENTION

Cellulose nanocrystals (CNCs) are crystalline, one-dimensional nanofibers that can be isolated from a wide variety of bioresources, including cotton, straw, wood, bacteria, or tunicates. In addition, commercial sources of these nanofibers have also recently become available with large scale production facilities being built in 2010-2012 in Canada and Sweden, as well as in the US (2012) by the US Forestry Service dramatically opening up the accessibility of these interesting materials. Depending on the biosource and method of isolation, the nanofibers display aspect ratios ranging from 10 to >100, offering access to a selection of nanofibers that can be investigated. FIG. 1 shows three different CNC types, obtained from tunicates (FIG. 1(a)); commercially available microcrystalline cellulose (biosource wood) (FIG. 1(b)): and from *Miscanthus* x. *Giganteus* (MxG) (FIG. 1(c)). CNCs obtained from tunicates have an aspect ratio of ca. 80 with a width of ca. 20 nm. CNCs obtained from microcrystalline cellulose (mCNC) and MxG (MxG-CNC) have fiber widths of ca. 5 nm, but exhibit different aspect ratios of ca. 10-20 and 60-70, respectively.

Owing to their strongly interacting surface hydroxyl groups, uncharged CNCs have a tendency towards aggregation, which can lead to poor dispersability and phase segregation during material processing. To counterbalance the attractive forces imparted by the surface hydroxyl groups, charged (usually either sulfonate or carboxylic acid functionalized, FIG. 1(d) CNCs are used as they are easier to disperse in water or polar organic solvents (DMF, DMAc, Formic acid, etc.) on account of the electrostatic repulsion introduced by the anionic surface groups. Sulfonation occurs during the CNC isolation step by sulfuric acid hydrolysis of the biosource yielding sulfonated CNCs (CNC—$SO_3^-$). Carboxylic acid functionalized CNCs (CNC—$CO_2H$) can be prepared by isolating uncharged cellulose CNCs from the biosource, via hydrochloric acid (rather than sulfuric acid) hydrolysis during the isolation procedure, followed by oxidization of the primary C6-hydroxyl via a TEMPO mediated oxidation procedure. One key attribute of CNCs is their amphiphilic character, which is a consequence of the cellulose crystal structure. They are globally hydrophilic with hydrophobic edges. As such they are known to self-assemble at the oil/water interface. Recently work has been published demonstrating oil-in-water emulsions using CNCs as the stabilizer. For example, in *Biomacromolecules*, 2012, 13 (1), pp 267-275 it has been shown that emulsions droplets of >1 µm can be obtained using unfunctionalized or lightly charged CNCs. Furthermore is was shown that latex particles can be formed of >1 µm can be obtained by polymerizing styrene/water emulsion stabilized by CNC—$SO_3^-$.

SUMMARY OF THE INVENTION

In view of the above, a problem of the prior art was to provide stabilized emulsions or latexes, and more specifically, emulsions or latexes having nano-size droplets that are less than 600 nm in diameter. Such nano-sized emulsions are important for many applications such as paints and coatings.

The noted problem and others are solved by the compositions of the present invention which are nano-emulsions or nano-latexes comprising hydrophobically functionalized cellulose nanocrystals, which are used as a surfactant to stabilize the emulsions or latexes. Stable emulsions are accessed by adding organic, non-water soluble molecules as the oil phase to an aqueous CNC suspension followed by agitation, for example sonication.

An object of the invention is to show that when CNCs, from a range of biosources, were further functionalized with different hydrophobic groups, their ability to stabilize the oil/water interface changes dramatically. With an appropriate hydrophilic/hydrophobic balance of the alkyl functionalized CNCs oil-in water emulsions with droplets around 250 nm can be stabilized.

Yet another object of this invention is to show that nanolatexes can be obtained from these nano-emulsions by polymerization of the oil/monomer phase with appropriate initiators. The results open opportunities for the utilization of these materials as environmental friendly surfactants in coating applications.

Yet another object of the present invention to show that altering the type and amount of the functionalization of the CNCs nano-sized emulsions can be obtained with different molecules or monomers. For example, by using hexyl functionalized MxG-CNCs (CNCs from *Miscanthus* x. *Giganteus*), a mixture of styrene and acrylate monomers, which consist of methyl methacrylate (ca. 7.5 wt. % of oil phase), 2-ethylhexyl acrylate (ca. 43.2 wt. % of oil phase) and styrene (ca. 49.3 wt. % of oil phase), up to 45 wt % can be stabilized with droplet sizes less than 300 nm, while butyl functionalized mCNCs (obtained from commercially available Microcrystalline Cellulose) yields droplet sizes less than 300 nm when the oil phase consists of only styrene.

BRIEF DESCRIPTION OF THE DRAWINGS

The invention will be better understood and other features and advantages will become apparent by reading the detailed description of the invention, taken together with the drawings, wherein:

FIG. 5 illustrates synthesis of tCNC-allyl-$CO_2$Hs;

DETAILED DESCRIPTION OF THE INVENTION

In this specification, all numbers disclosed herein designate a set value, individually, in one embodiment, regardless of whether the word "about" or "approximate" or the like is used in connection therewith. In addition, when the term such as "about" or "approximate" is used in conjunction with a value, the numerical range may also vary, for example by 1%, 2%, 5%, or more in various other, independent, embodiments.

Nano-emulsions and nano-latexes with functionalized CNCs as surfactant to stabilize the same are disclosed herein. Methods for preparing the nano-emulsions and nano-latexes are also disclosed.

Cellulose Nanocrystals (CNCs)

Numerous different types of cellulose nanocrystals can be utilized in the present invention. Cellulose nanocrystals have been isolated from various organic sources. Cellulose is found primarily in plants, such as wood, cotton, grass or corn, but is also present in selected marine animals such as sea tunicates, as well as algae, bacteria and fungi. Cellulose nanocrystals isolated from wood are commercially available. Cellulose nanocyrstals can also be obtained from commercial microcrystalline cellulose (mCNC). Cellulose nanocrystals isolated from tunicates have higher aspect ratios (about 80) than those obtained from wood/mCNC (20-40/10-20 respectively). The cellulose nanocrystals can also be isolated from *Miscanthus* x. *Giganteus* (MxG-CNCs) and generally have aspect ratios (60-70). The diameters range from about 2 to about 30 nm and are typically ca. 5 nm when obtained from plant resources and about 20 nm when obtained from tunicates and the lengths range from about 100 nm to about several micrometers. Methods from producing CNCs from wood, tunicates, bacteria and many plant sources are well documented.

Methods for producing cellulose nanocrystals from *Miscanthus* x. *Giganteus* are set forth in U.S. Patent Application Ser. No. 61/918,993, herein fully incorporated by reference.

All the CNCs utilized in the present invention are functionalized with one or more functional groups.

Suitable functionality includes, but is not limited to, charged groups (such as carboxylic acid groups, sulfonate groups, phosphate groups) and hydrophobic groups (such as alkyl groups, allyl groups and aryl groups). Formation of suitable functionalized CNCs is described herein and known in the art.

In order to provide desired properties to the nano-emulsions and nano-latexes of the present invention, the functionalized CNCs are utilized generally in an amount from about 0.1 to about 2.0 wt. %, desirably from about 0.5 to about 1.5 wt. % and preferably from about 0.5 to about 1.0 wt. % based on the total weight (oil phase molecules or monomers, water and functionalized CNCs of the nano-emulsion or nano-latex composition.

Figure 12:
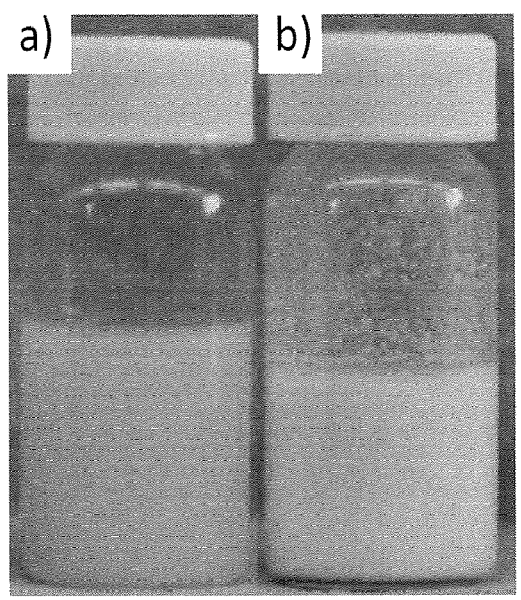
FIG. 12(a) illustrate the aqueous solution of 0.5 wt % mCNC-dodecyl-$CO_2$Hs and (b) the emulsion made by adding 35 wt % styrene to 65 wt % of (a) and sonication.
Figure 13:
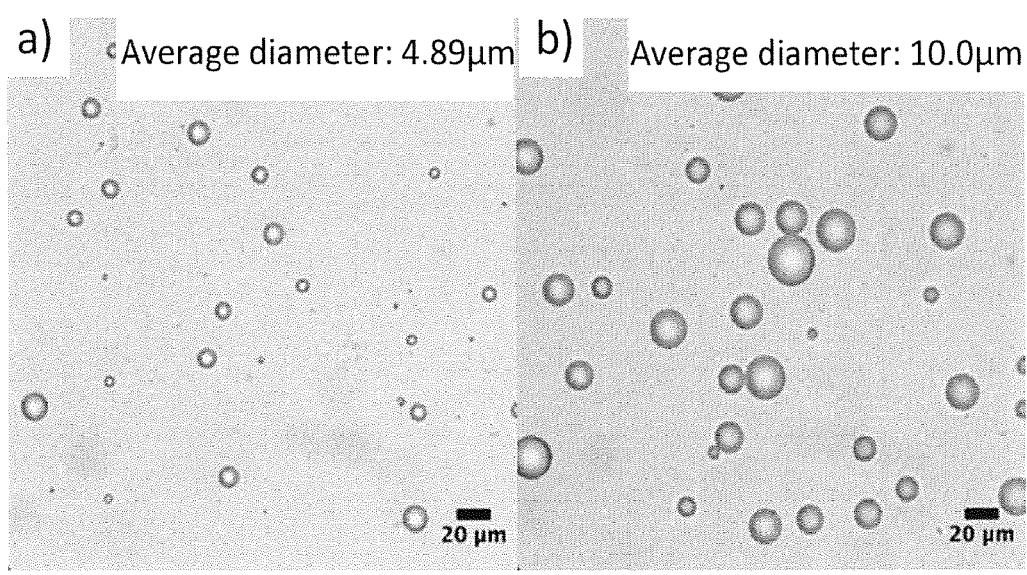
FIG. 13 illustrate optical microscope images of the styrene-in-water emulsion stabilized by mCNC-dodecyl-$CO_2$Hs (a) after sonication and (b) after centrifugation.

Obtaining the correct hydrophilic/hydrophobic balance is important. This will depend on the amount hydrophobic group attached to the surface, the presence of charged groups and also the size of the hydrophobic group (e.g. length of chain). Ideally the level of functionalization should not be so high as to prevent the majority of the CNCs from being dispersible in water. For example we have shown that functionalization with dodecyl moieties (C12 alkyl chains) results in poor dispersion of these CNCs in water and the formation of large unstable emulsion droplets (FIGS. 12 and 13).

Organic, Non-Water Soluble Molecules or Monomers

Various molecules or monomers (individually or mixtures thereof) can be utilized in the nano-emulsions and nano-latexes of the present invention. Examples of suitable monomers include, but are not limited to, one or more aromatic vinyl monomers, one or more vinyl monomers, one or more (meth)acrylate monomers wherein "(meth)" means that the methyl group can be present or absent, and one or more diene monomers. The type of hydrophobically functionalized CNC to be used as a surfactant and the character of the nano-emulsions and nano-latexes obviously depends upon the chemical structure of the monomers utilized.

The term "aromatic vinyl" is to include those of the benzene series, such as styrene and its analogs and homologs including o-methylstyrene, p-methylstyrene, p-tert-butylstyrene, 1,3-dimethylstyrene, alpha-methylstyrene and other ring alkylated styrenes, particularly ring-methylated styrenes, vinyl pyridine and other monoalkenyl polycyclic aromatic compounds such as vinyl naphthalene, vinyl anthracene and the like. The preferred aromatic vinyl compounds are monovinyl monocyclic aromatics, such as styrene and alpha-methylstyrene, with styrene being most preferred.

Non-limiting examples of suitable vinyl monomers include, but are not limited to, vinyl acetate, vinyl chloride, vinylidene chloride, and vinyl ethers.

(Meth)acrylates include, but are not limited to, nitriles such as acrylonitrile, the various acrylic ester monomers as well as other monomers based on acrylic-methacrylic moieties.

Examples of suitable dienes include the various butadienes, isoprenes, pentadienes, cyclopentadienes and so on.

In order to provide desired properties to the nano-emulsions and nano-latexes of the present invention, the molecules or monomers are utilized generally in an amount from about 20 to about 60 wt. %, desirably from about 30 to about 50 wt. % and preferably from about 35 to about 45 wt. % based on the total weight of the oil phase molecules or monomers, water, and functionalized CNCs of the nano-emulsion or nano-latex composition.

As described hereinabove, in order to form the nano-emulsions and nano-latexes, monomer, as the oil phase is combined with an aqueous functionalized CNC-containing suspension, followed by agitation. Sonication is utilized in one embodiment. The monomers can be polymerized as known in the literature and the art. Various initiators or other polymerization aids can be utilized in effective amounts as known to the literature and to the art.

The resulting emulsions or latexes have an emulsion or latex droplet size of less than 600 nm in diameter, desirably a droplet size between 200 and 500 nm, and preferably a droplet size between 250 and 400 nm.

The following examples demonstrate the ability of functionalized CNC to stabilize a styrene-based latex, having a solids content between 35 to 45%, and a droplet size of 600 nm or lower, wherein the latex has colloidal stability during and post polymerization. Various surface functionalized and aspect ratios have been utilized.

Emulsion droplet sizes and stabilities can be controlled by the surface functionalization and the amount of functionalized CNCs.

For styrene emulsions, in one embodiment the best hydrophilic/hydrophobic balance (with CNCs that have ca. 300 mmol/kg alkyl chains and ca. 200 mmol/kg —$CO_2H$ groups) appears with mCNCs functionalized with butyl groups, a 35% styrene-in-water emulsions with droplet sizes much less than 600 nm (ca. 250 nm) have be prepared. This the first nanosized emulsions stabilized by cellulose nanocrystals ever reported in the literature.

Figure 1:
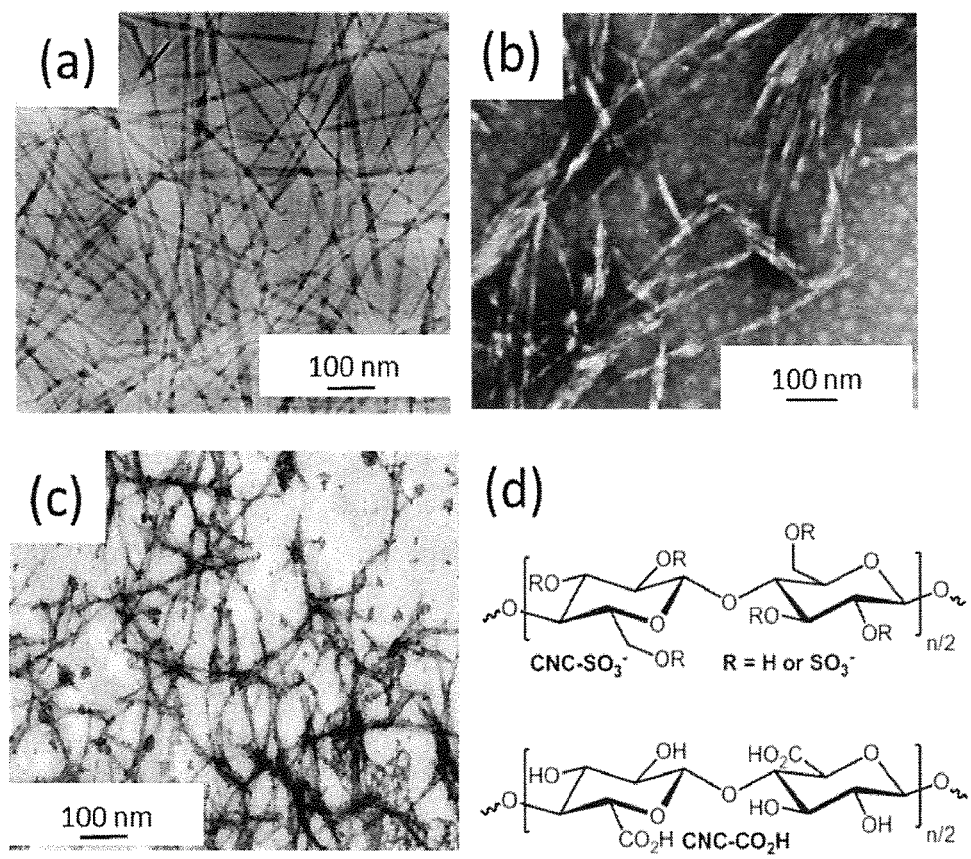
FIG. 1(a)-(d) illustrate TEM images of cellulose nanocrystals isolated from (a) tunicate, (b) microcrystalline cellulose, (c) *Miscanthus Giganteus* and (d) chemical structures of sulfonated and carboxylic acid functionalized CNCs.
Figure 2:
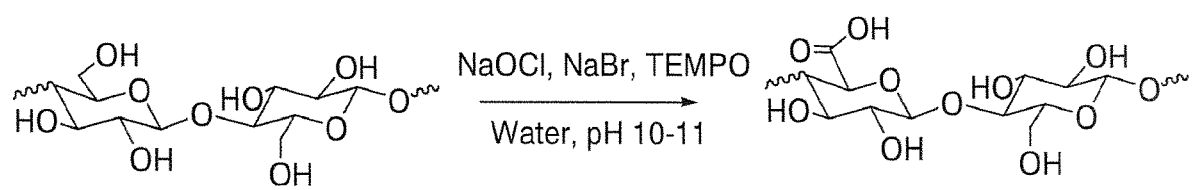
FIG. 2 illustrates oxidation of CNCs to CNC—$CO_2Hs$.

Carboxylic acid functionalized tunicate cellulose nanocrystals (tCNC—$CO_2$Hs):

Carboxylic acid functionalized tunicate cellulose nanocrystals (tCNC—$CO_2$Hs) were prepared by oxidation of tCNCs using TEMPO mediated oxidation (FIG. 2), to yield a $CO_2H$ surface functionalization of 770 mmol/kg. The nomenclature we will use for these CNCs is tCNC—$CO_2H_{770}$, where the prefix t means the source of CNCs is from tunicates, the term after the dash is the primary type of functionality on the surface (other than the —OH moieties) and the subscript number is the concentration of the functional groups on the surface, in this case 770 mmol/kg.

Figure 3:
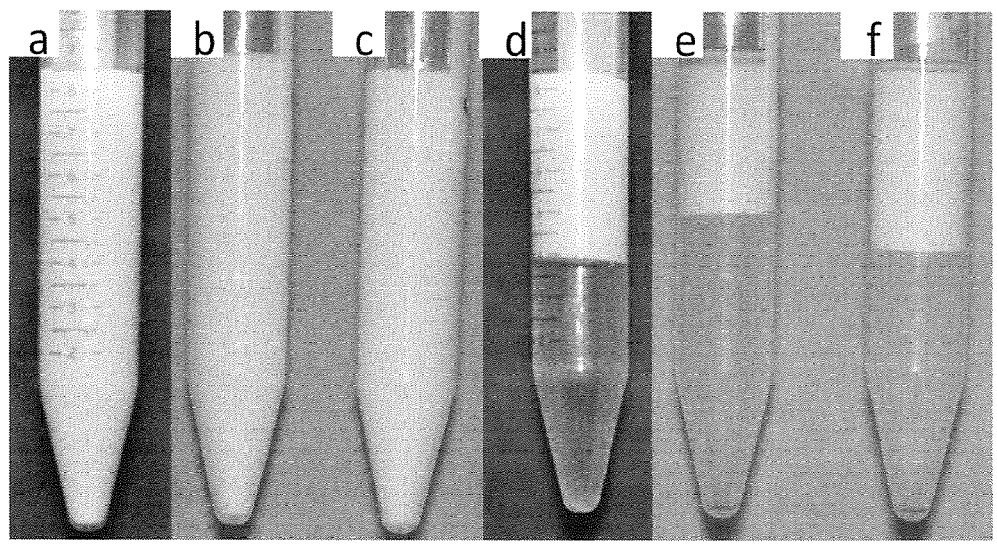
FIG. 3(a)-(f) illustrate styrene-in-water emulsions stabilized by 0.325 wt % (a), (d), 0.65 wt % (b), (e), and 1.3 wt % (c), (f) tCNC—$CO_2H_{770}$ after ultrasonication (a), (b), (c) and centrifuge (d), (e), (f); wherein the subscript 770 refers to the mmol/kg of the carboxylic acid groups on the CNC surface as measured by conductometric titrations, with similar notations being used elsewhere in the specification.
Figure 4:
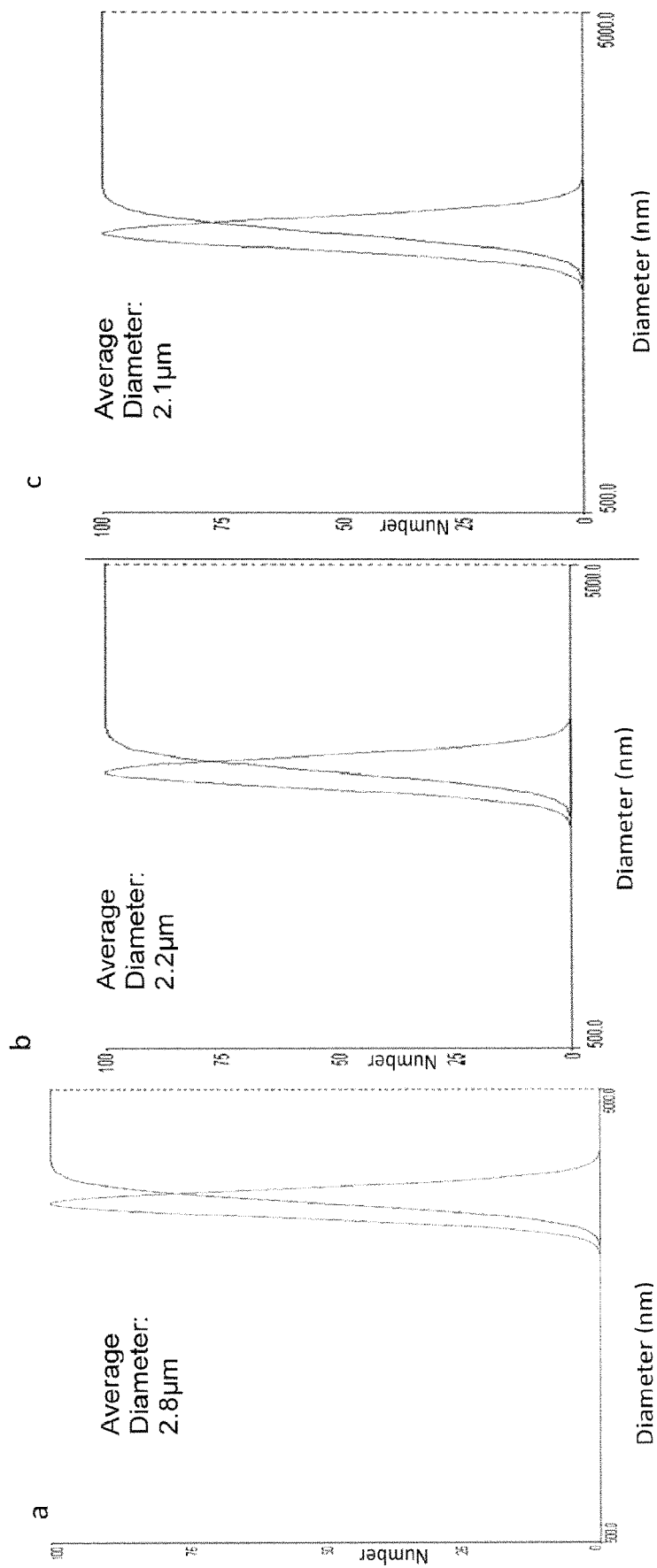
FIG. 4(a)-(c) illustrate dynamic light scattering (DLS) data of the average diameter of the emulsion droplets stabilized by 0.325 wt % (a), 0.65 wt % (b) and 1.3 wt % (c) tCNC—$CO_2H_{770}$s.

The tCNC—$CO_2H_{770}$s were dispersed in water at different concentrations (0.5, 1 and 2 wt. %) to be employed as the continuous phases. 35 wt. % styrene was then added as the dispersed phase. The whole solution was then hand shaken before being ultrasonicated (pulse mode 3 s on followed by 3 s standby) for 60 s (120 s total) (FIG. 3(a)-(c)). It is worth pointing out that the final concentration of the CNCs in the resulting emulsions is now 0.325 wt %, 0.65 wt % and 1.3 wt %, respectively. The emulsions were then centrifuged at 4000 g for 10 min to determine their stability. As can be seen from FIG. 3(d)-(f), the effect of centrifugation of the samples was to form densely packed emulsions on top of the water phase, but no visible destabilization of the emulsion phase was observed in all three systems, consistent with the formation of stable emulsions. Next the sizes of the emulsion droplets were analyzed using dynamic light scattering (DLS) and the results are shown in FIG. 4. The size of the droplets decreased slightly from 2.8 μm to 2.2 μm as the concentration of the tCNC—$CO_2H_{770}$s increased from 0.325 wt. % to 0.65 wt. %, suggesting more CNCs are absorbed at the oil/water interface in order to stabilize smaller emulsion droplets. However, the droplet diameter showed no further decrease when higher concentrations (1.3 wt. %) of CNCs were used. The hypothesis here is that maximum coverage of CNCs on the oil/water interface has been reached, and this is consistent with the cloudiness of the water phase after centrifuge of the emulsions (FIG. 3(d)-(f)). For emulsion stabilized by 0.325 wt % CNCs (FIG. 3(d)), the water phase is clearer consistent with nearly all the CNCs in the emulsion. For emulsion stabilized by 0.65 wt % and 1.3 wt % CNCs (FIG. 3(e), (f)), the cloudiness of the water phase increases suggesting that the interface in the emulsion has been covered by a maximum amount of CNCs and any excess CNCs remains in the water phase.

There are two reasons that this may happened: (1) The negative charges on the CNCs may result in some destabilization of the CNCs at the oil-water interface and (2) the CNCs are too water soluble and as such not all go to the interface. Given the pKa of a carboxylic acid moiety is ca. 4.5 and these materials were prepared using distilled water we can assume that the majority of the carboxylic acid moieties are in the carboxylate form. Saying this we have previously shown that there is evidence that not all the $CO_2$Hs are deprotonated in neutral pH water. It is possible the residual negative charges will result in repulsion between the neighboring tCNCs and thus lower the amount of CNCs that can be absorbed at the interface. It is also probable that if the charge density of the CNC is too high the CNCs would prefer to disperse in the water phase than be at the interface.

Allyl functionalized tunicate cellulose nanocrystals (tCNC-allyl-CO$_2$Hs):

As suggested above it is possible that the CNC—COOHs are too hydrophilic and as such it would be desirable to alter the hydrophilic/hydrophobic balance of the CNCs. To do this it was decided to investigate the functionalization of the surface carboxylic acid moieties with allyl amine. To do this the tCNC—CO$_2$H$_{770}$s were reacted with allyl amine to form tCNC-allyl-CO$_2$Hs (FIG. 5). This would achieve a number of things (1) increase the hydrophobicity of the CNCs, (2) reduce the CNC charge density and (3) provide functional groups that could be react during the polymerization to covalently fix the CNC into the film.

Figure 6:
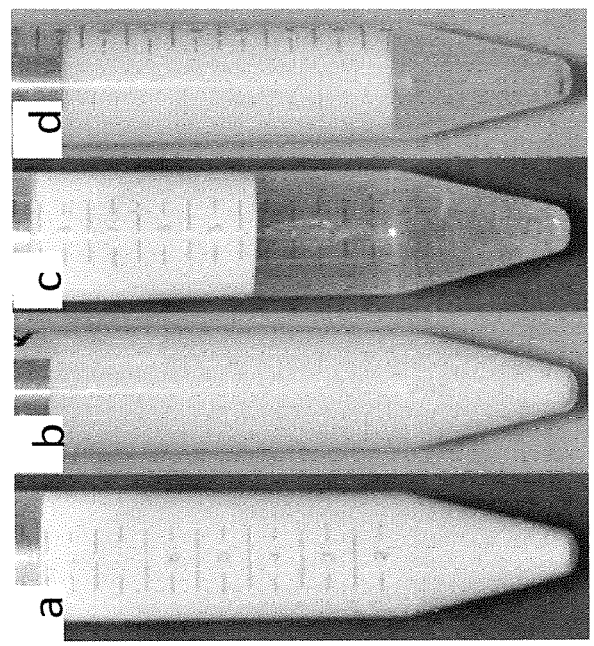
FIG. 6(a)-(d) illustrate styrene-in-water emulsions stabilized by 0.325 wt % (a), (c) and 0.65 wt % (b), (d) tCNC-allyl$_{490}$-$CO_2H_{280}$s after ultrasonication (a), (b) and centrifuge (c), (d)
Figure 7:
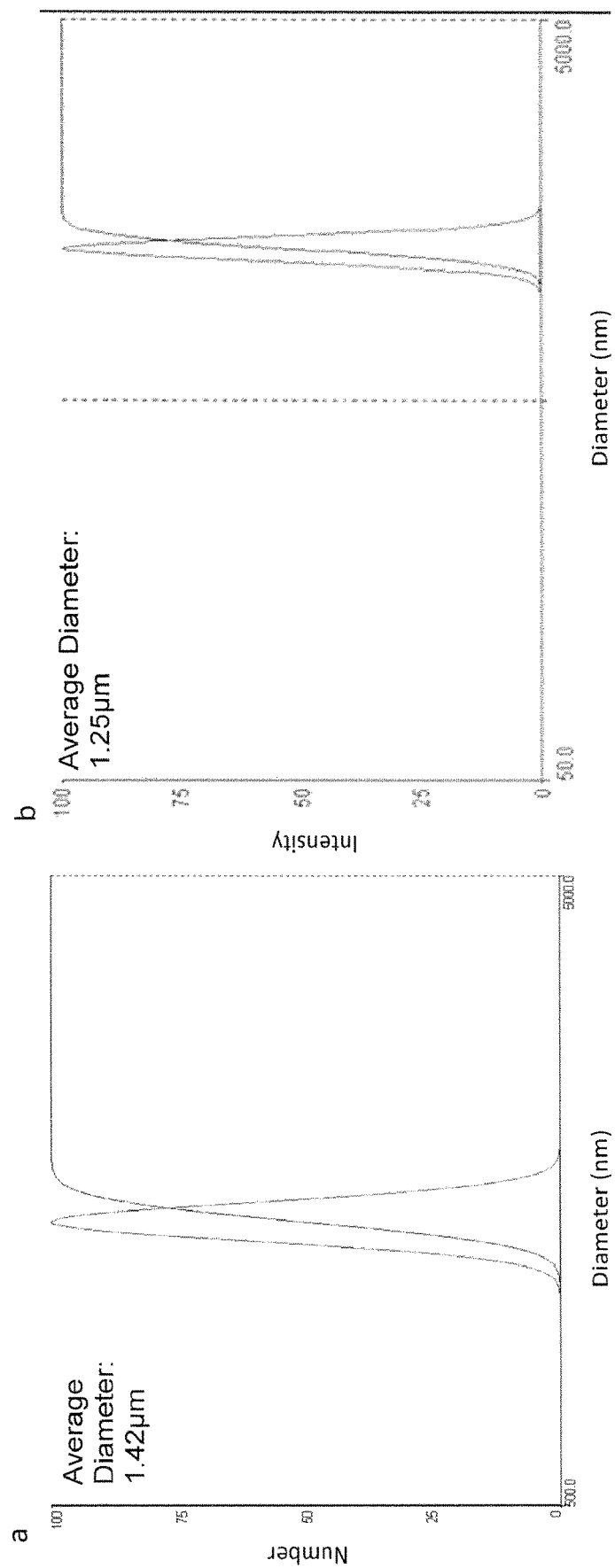
FIG. 7(a)-(b) illustrate dynamic light scattering (DLS) data of the average diameter of the emulsion droplets stabilized by 0.325 wt % (a) and 0.65 wt % (b) tCNC-allyl$_{490}$-$CO_2H_{280}$s.

After the reaction, conductometric titrations showed the CNCs had a residual CO$_2$H charge density of 280 mmol/kg, which means that 490 mmol/kg of CO$_2$H units were converted to hydrophobic allyl groups (i.e. tCNC-allyl$_{490}$-CO$_2$H$_{280}$). The tCNC-allyl$_{490}$-CO$_2$H$_{280}$s were dispersed in water at 0.5 wt. % and 1 wt. %, and employed as the continuous phase. After adding the styrene monomer (35 wt. %), a milky emulsion formed again upon sonication and was stable upon being centrifuged (FIG. 6). The final concentration of tCNC-allyl$_{490}$-CO$_2$H$_{280}$ in these emulsions is 0.325 wt. % and 0.65 wt. %. The average diameter of the emulsion droplets characterized by DLS was 1.42 μm and 1.25 μm for emulsions stabilized by 0.325 wt % and 0.65 wt % tCNC-allyl$_{490}$-CO$_2$H$_{280}$, respectively (FIG. 7). The droplet size is much smaller when using tCNC-allyl$_{490}$-CO$_2$H$_{280}$s compared to the tCNC—CO$_2$H$_{770}$s at the same concentration and provided our first data suggesting that CNC functionalization can be used to impact the particle size of the emulsion.

There are a number of possible explanations for this result. For example, by introducing more hydrophobic groups, the hydrophilic/hydrophobic balance of the CNC surfaces is altered reducing the water solubility of the CNC and resulting in more CNC absorption at the interface. Furthermore, converting some of the charged groups to uncharged species, results in a decrease in the overall charge on the CNCs so there will be less repulsion between neighboring CNCs and thus enhance their concentration at the interface.

Figure 8:
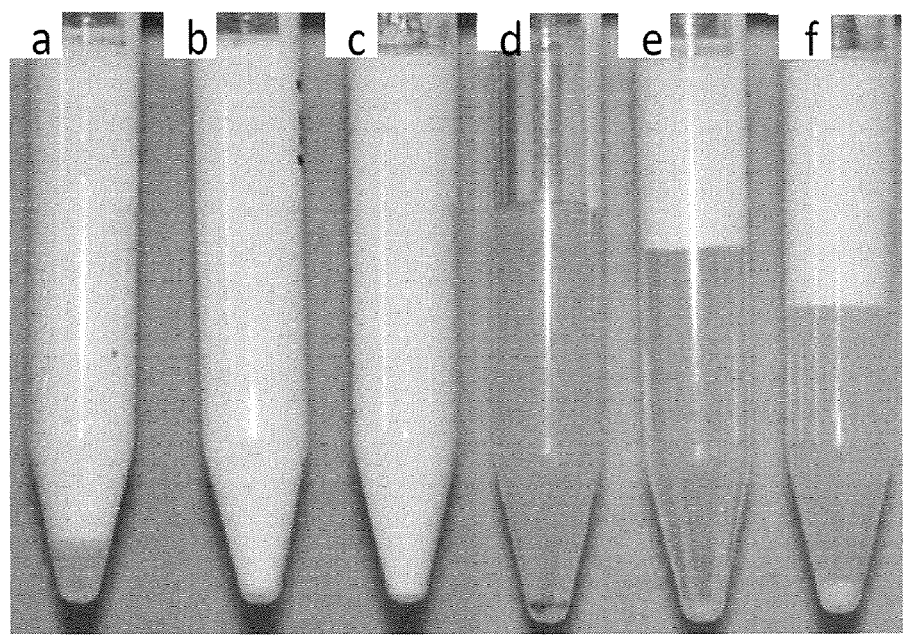
FIG. 8(a)-(f) illustrate styrene-in-water emulsions stabilized by 0.325 wt % (a), (d), 0.65 wt % (b), (e) and 1.3 wt % (c), (f) mCNC—$CO_2H_{460}$s after ultrasonication (a), (b), (c) and centrifuge (d), (e), (f)

Carboxylic acid and allyl functionalized microcrystalline cellulose nanocrystals (mCNC—CO$_2$Hs, mCNC-allyl-CO$_2$Hs):

CNCs isolated from microcrystalline cellulose (mCNC) were chosen and have a lower aspect ratio (~10) compared to the tunicate CNCs (~80). First, the mCNCs were oxidized using the same oxidation procedure used for the tCNCs to yield mCNC—CO$_2$H$_{460}$s, with a charge density of 460 mmol/kg as determined by conductometric titrations. The mCNC—CO$_2$H$_{460}$s have a lower aspect ratio than the tunicate CNCs so is reasonable to expect that a higher concentration of mCNC—CO$_2$Hs will be required in the water phase to stabilize the styrene droplets. Thus a concentration study was carried out with the mCNC—CO$_2$H$_{460}$s being dispersed in water at different concentrations (0.5 wt %, 1 wt % and 2 wt %) and used as a continuous phase. The disperse phase was kept as styrene with 35 wt %. The styrene/aqueous solutions with different amount of mCNC—CO$_2$H$_{460}$s were all subjected to same sonication and centrifuge conditions, and the results are shown in FIG. 8. For the sample containing the lowest concentration of mCNC—CO$_2$H$_{460}$s (0.325 wt % in the overall emulsion) the emulsion completely phase separated after being centrifuged, indicating the emulsions were unstable. However, for the other two emulsions, no such phase separation occurred, suggesting that at least 1 wt % of mCNC—CO$_2$H$_{460}$s in the water phase (0.65 wt % in the final emulsion) is required to make stable emulsions.

Figure 9:
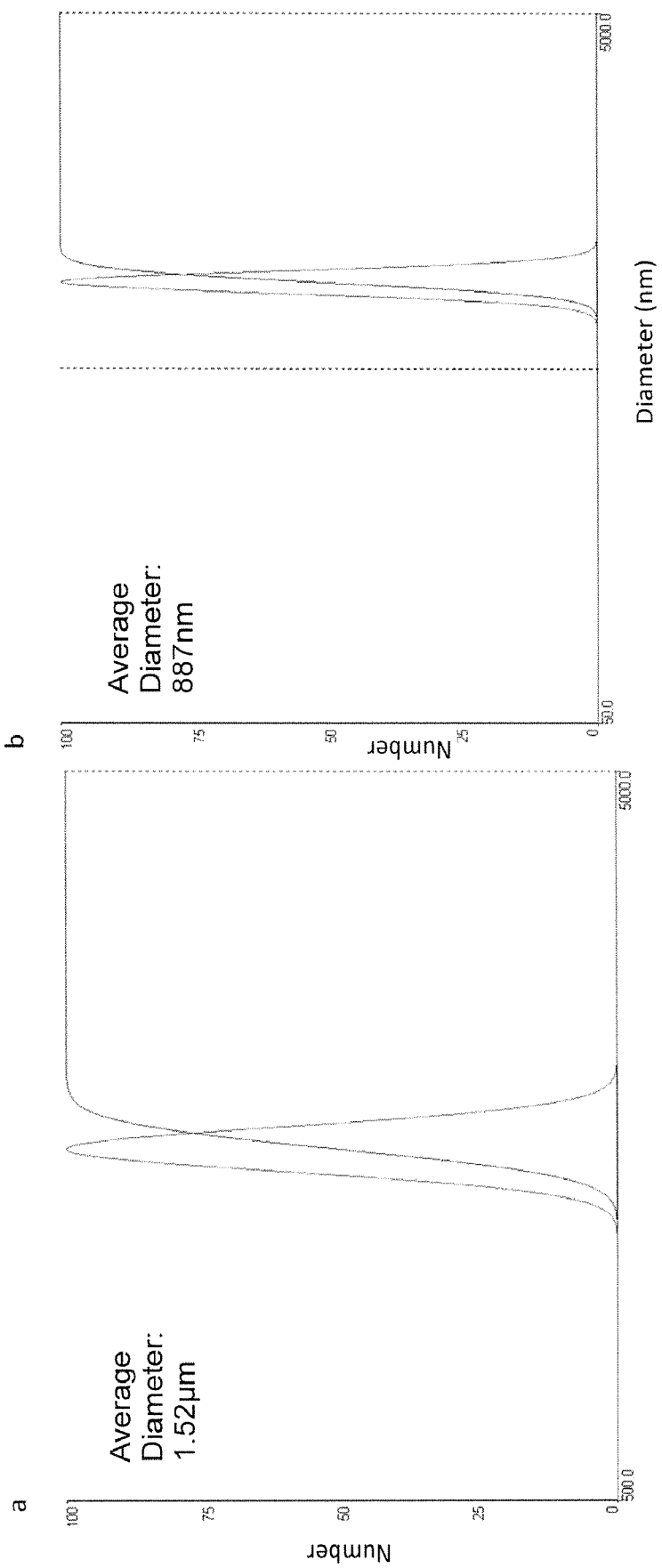
FIG. 9(a)-(b) illustrate dynamic light scattering (DLS) data of the average diameter of the emulsion droplets stabilized by 0.325 wt % (a) and 0.65 wt % (b) mCNC-allyl$_{270}$-$CO_2H_{190}$.

Since the previous results showed that allyl functionalized tCNCs help to decrease the droplet diameters, the same chemistry was carried out on mCNC—CO$_2$Hs to make mCNC-allyl-CO$_2$Hs. Conductometric titrations showed a residual CO$_2$H charge density of 190 mmol/kg, which means that 270 mmol/kg of CO$_2$H units were converted to hydrophobic allyl groups (i.e. mCNC-allyl$_{270}$-CO$_2$H$_{190}$). These allyl functionalized mCNCs were dispersed in water at 0.5 wt. % and 1 wt. % and then employed as the continuous phase. After addition of 35 wt. % styrene and sonication, stable emulsions were formed for both samples, even at the lower concentration (0.5 wt. % in water, 0.325 wt. % in overall emulsions), which again confirms that by converting from the CO$_2$H moieties to allyl groups helps to stabilized the oil/water interface. DLS results showed that the average diameter was 1.52 μm and 887 nm for emulsions stabilized by 0.5 wt. % (0.325 wt. % in overall emulsion) and 1 wt. % (0.65 wt. % in overall emulsion) mCNC-allyl-CO$_2$Hs, respectively (FIG. 9). Comparing the results from both tCNC-allyl$_{490}$-CO$_2$H$_{280}$s (1.25 μm) and mCNC-allyl$_{270}$-CO$_2$H$_{190}$ (887 nm) at the same concentration (0.65 wt % in overall emulsion), we can see that smaller droplets can be stabilized by the mCNC-allyl$_{270}$-CO$_2$H$_{190}$. This may be due to a slightly less residual negative charges (190 mmol/kg) on the surface compared to that of tCNC-allyl$_{490}$-CO$_2$H$_{280}$ (280 mmol/kg) that results in more CNCs at the oil water interface.

Figure 10:
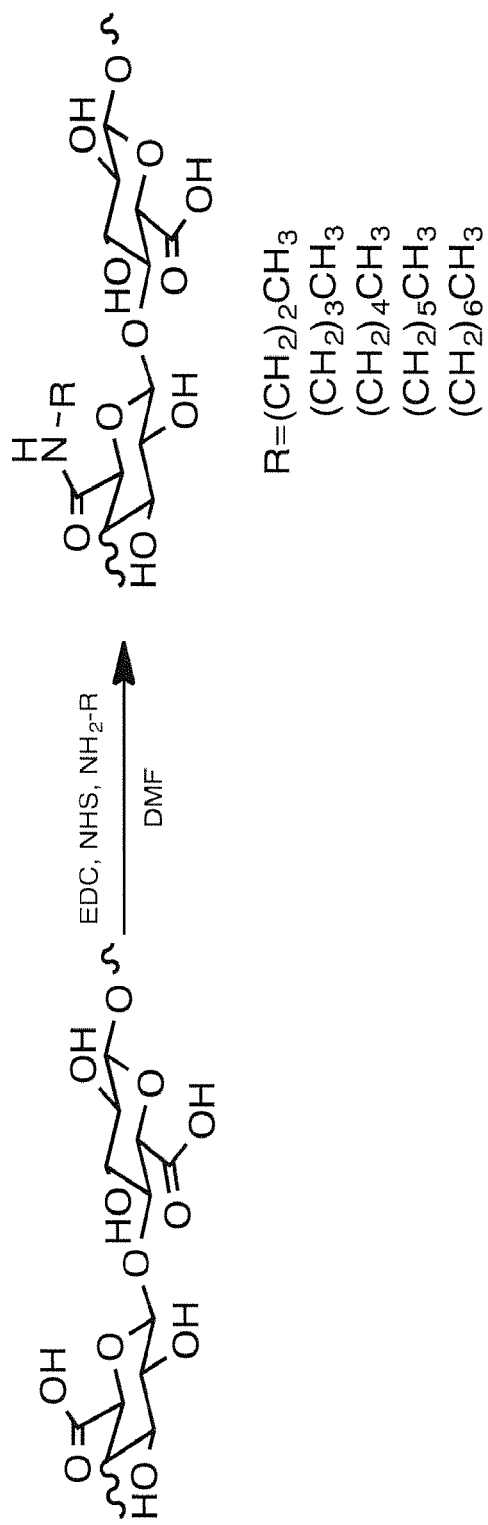
FIG. 10 illustrates a functionalizing of CNC—$CO_2$H with different sized alkyl chain moieties.

Functionalized microcrystalline cellulose nanocrystals with more hydrophobic groups:

We further studied how far we can push the hydrophobic/hydrophilic balance of the CNCs in order to make stable emulsions with even smaller droplet size. To this end, a new batch of mCNC—CO$_2$H$_{520}$s with 520 mmol/kg of carboxylic acid groups were functionalized with different alkyl amines (propyl amine, n-butyl amine, amyl amine, hexyl amine, heptyl amine and dodecyl amine) using the same amine coupling reaction (FIG. 10), and the final materials were titrated to quantify the amount of hydrophobic groups on the surface, which yielded mCNC-propyl$_{290}$-CO$_2$H$_{230}$, mCNC-butyl$_{350}$-CO$_2$H$_{170}$, mCNC-amyl$_{300}$-CO$_2$H$_{220}$, mCNC-hexyl$_{320}$-CO$_2$H$_{200}$ and mCNC-heptyl$_{315}$-CO$_2$H$_{205}$. The dodecyl functionalized mCNCs could not be titrated since they could not be dispersed in water very well.

Figure 11:
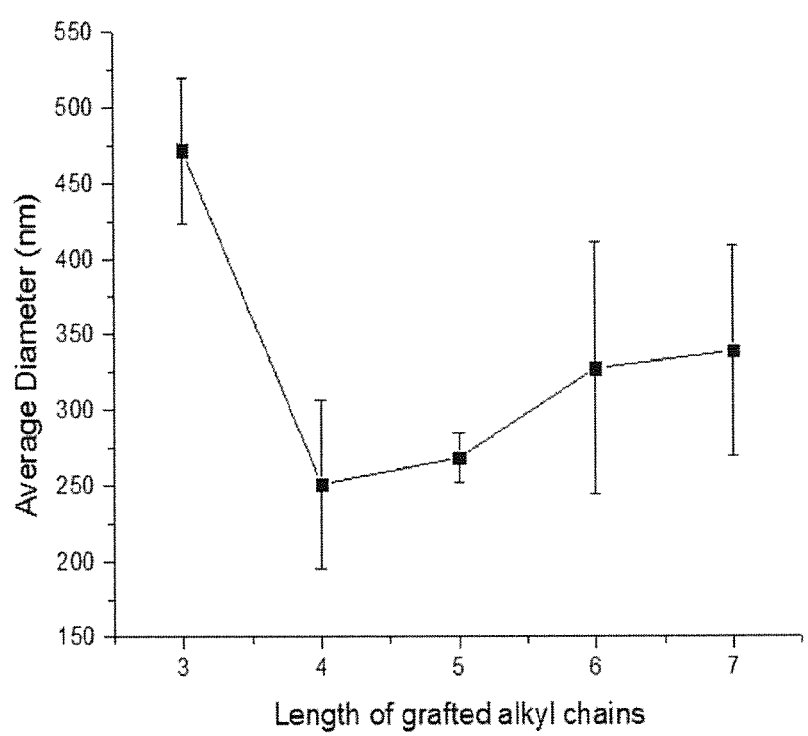
FIG. 11 is a comparison of the average diameter of the emulsion droplets (35 wt. % styrene) stabilized by mCNCs functionalized with different length of alkyl grafted onto the CNC surface (number on x axis refers to the number of carbon atoms in chain). The diameters were measured by DLS.

Longer alkyl groups on the surface will make the mCNCs more hydrophobic. All the functionalized materials (mCNC-propyl$_{290}$-CO$_2$H$_{230}$, mCNC-butyl$_{350}$-CO$_2$H$_{170}$, mCNC-amyl$_{300}$-CO$_2$H$_{220}$, mCNC-hexyl$_{320}$-CO$_2$H$_{200}$ and mCNC-heptyl$_{315}$-CO$_2$H$_{205}$) are all dispersible in water at 1 wt. % However, the mCNC-dodecyl-CO$_2$Hs cannot be dispersed in water. 35 wt % styrene-in-water emulsions can be stabilized using the functionalized CNCs (0.65 wt. % in overall emulsion) that can be dispersed in water, but the emulsions droplet sizes varies between each material. FIG. 11 shows a comparison of the average diameter of the droplets versus the length of alkyl groups that were functionalized onto the surface of mCNCs. From the DLS data, we can see that emulsions stabilized by mCNC-butyl$_{350}$-CO$_2$H$_{170}$ have the smallest droplet sizes and the diameter is below the 600 nm target (ca. 250 nm). It is important to note that there will be a dispersity in the degree of hydrophobic functionalization within a given sample and as such not all the CNCs are fully dispersible in water within the batch and presumably it will be mainly the soluble portion will be active as the surfactant. It is likely that the n-butyl functionalized mCNCs have just the right hydrophilic/hydrophobic balance, so when dispersing the same amount of functionalized CNCs in water, the more water soluble mCNC-butyl$_{350}$-CO$_2$H$_{170}$ has a higher concentration at the oil/water interface than mCNC-amyl$_{300}$-CO$_2$H$_{220}$, mCNC-hexyl$_{320}$-CO$_2$H$_{200}$ and mCNC-heptyl$_{315}$-CO$_2$H$_{205}$. And the amount of hydrophobic groups is enough to stable smaller oil droplets compared to mCNC-propyl$_{290}$-CO$_2$H$_{230}$. For the dodecyl functionalized mCNCs, it turned out that the CNCs are too hydrophobic to be dispersible in water, even at 0.5 wt %, and it is likely that they form micelles in the water phase (from cloudiness of the water phase) (FIG. 12). From the optical images of the emulsions made by adding 35 wt % styrene to 0.5 wt % mCNC-dodecyl-CO$_2$Hs aqueous solution and sonication, we can clearly see that the emulsion droplet diameters are very large (about 4.9 µm) and grow even larger after centrifugation (10 µm), which indicates a very unstable emulsion (FIG. 13).

Carboxylic acid functionalized and hydrophobic functionalized *Miscanthus* x. *Giganteus* cellulose nanocrystals (MxG-CNCs):

*Miscanthus* x. *Giganteus* cellulose nanocrystals (MxG-CNCs) with an aspect ratio 60-70 were oxidized by the same TEMPO mediated oxidation method, to yield a CO$_2$H surface charge density of 790 mmol/kg. The MxG-CNC—CO$_2$H$_{790s}$ were further functionalized with hexyl amine and heptyl amine, to change the hydrophobic-hydrophilic balance of the system. The amount of hydrophobic groups was again characterized through titrating the amount of residual carboxylic acid groups.

Figure 14:
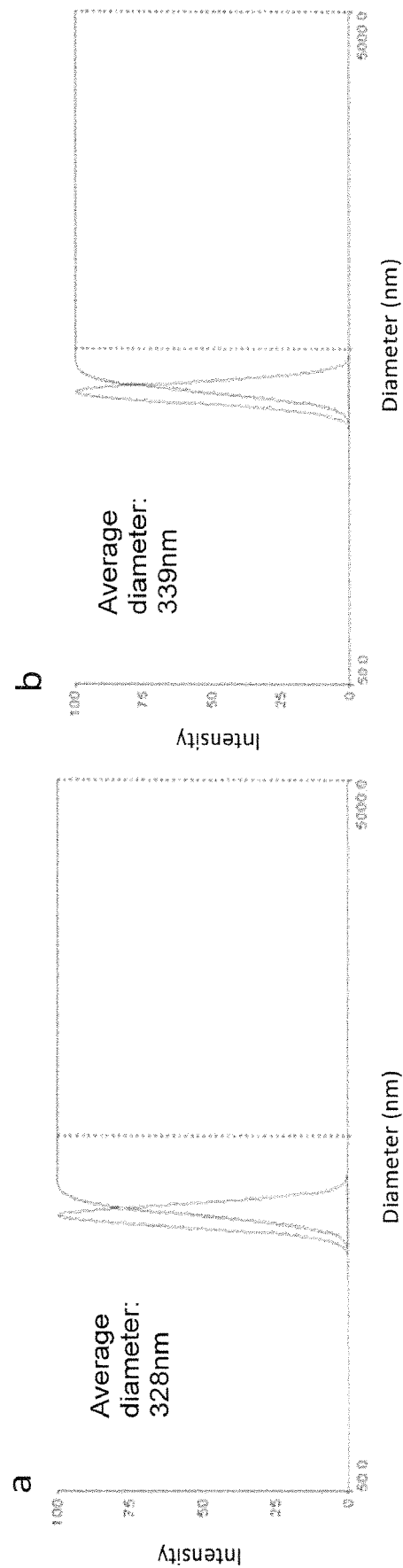
FIG. 14(a)-(b) illustrate DLS results of the average droplet diameters of 35 wt. % styrene-in-water emulsions stabilized by 1 wt. % of (a) MxG-CNC-hexyl$_{420}$-$CO_2H_{370s}$ and (b) MxG-CNC-heptyl$_{455}$-$CO_2H_{355s}$.

1 wt % of the MxG-CNC-hexyl$_{420}$-CO$_2$H$_{370}$s and MxG-CNC-heptyl$_{455}$-CO$_2$H$_{335}$s were dispersed in water and used to stabilize 35 wt % of styrene monomers. As shown in FIG. 14, the DLS characterizations of the emulsions stabilized by hexyl and heptyl functionalized MxG-CNCs (0.65 wt. % in overall emulsion) show that the average droplet diameters are 328 nm and 339 nm, respectively. These results are similar to the DLS results of emulsions stabilized by mCNC-hexyl$_{320}$-CO$_2$H$_{200}$ (300 nm) and mCNC-heptyl$_{315}$-CO$_2$H$_{205}$ (371 nm).

Oil-in-water emulsions using a mixture of styrene/acrylate monomers.

Figure 15:
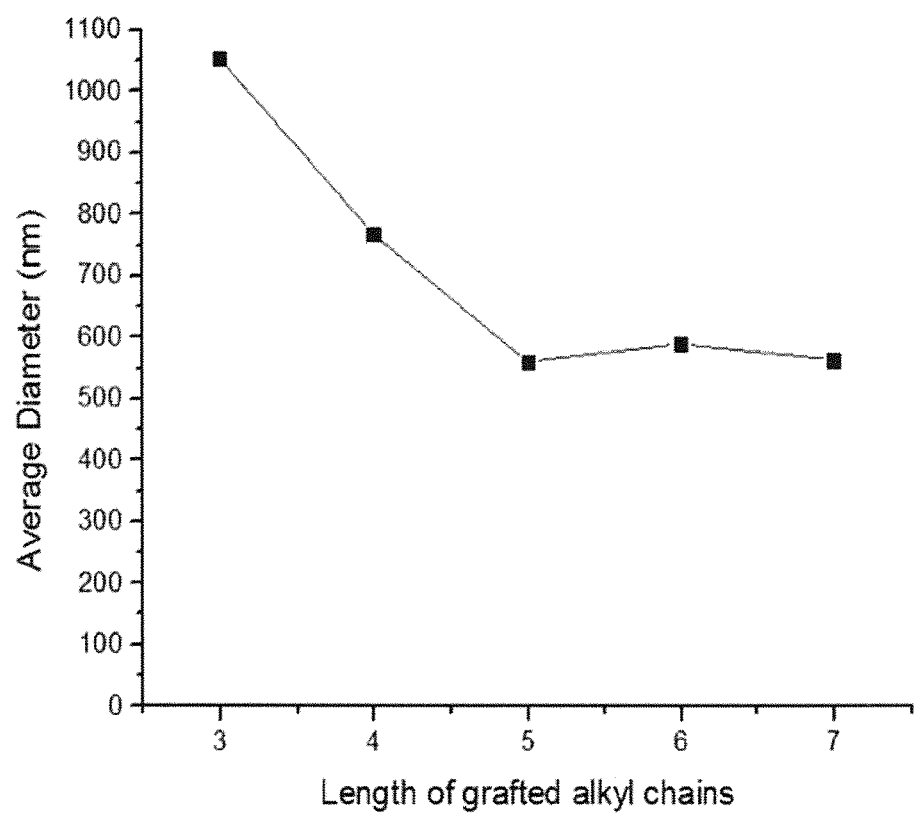
FIG. 15 illustrates DLS results of the average droplet diameters of 35 wt. % styrene/acrylate mix-in-water emulsions stabilized by 1 wt. % of mCNC-propyl$_{290}$-$CO_2H_{230}$, mCNC-butyl$_{380}$-$CO_2H_{170}$, mCNC-amyl$_{300}$-$CO_2H_{220}$, mCNC-hexyl$_{320}$-$CO_2H_{200}$ and mCNC-heptyl$_{315}$-$CO_2H_{205}$, which correspond to length of grafted chains 3-7 respectively.
Figure 16:
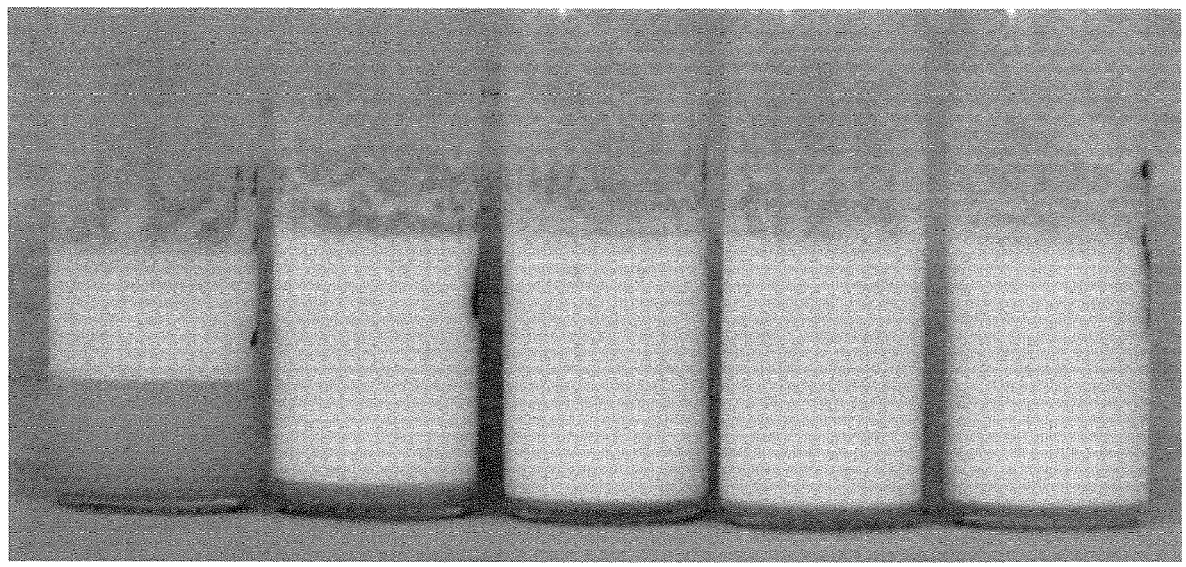
FIG. 16 illustrates the emulsions with 35 wt. % acrylate/styrene mixture stabilized by mCNC-propyl$_{290}$-$CO_2H_{230}$, mCNC-butyl$_{350}$-$CO_2H_{170}$, mCNC-amyl$_{300}$-$CO_2H_{220}$, mCNC-hexyl$_{320}$-$CO_2H_{200}$, and mCNC-heptyl$_{315}$-$CO_2H_{205}$.

To demonstrate that cellulose nanocrystals can be used to make stable oil-in-water emulsions using various molecules or monomers, a mixture of styrene/acrylate monomers were used instead of neat styrene to employ as oil phase. The mixture consists of methyl methacrylate (ca. 7.5 wt. % of oil phase), 2-ethylhexyl acrylate (ca. 43.2 wt. % of oil phase) and styrene (ca. 49.3 wt. % of oil phase). First, 1 wt % of hydrophobic functionalized mCNCs (mCNC-propyl$_{290}$-CO$_2$H$_{230}$, mCNC-butyl$_{350}$-CO$_2$H$_{170}$, mCNC-amyl$_{300}$-CO$_2$H$_{220}$, mCNC-hexyl$_{320}$-CO$_2$H$_{200}$ and mCNC-heptyl$_{315}$-CO$_2$H$_{205}$) were used to stabilize 35 wt % acrylate monomer mixture, and the DLS results of the droplet diameter are shown in FIG. 15. Compared to pure styrene monomers, the acrylate monomer mixtures are slightly more hydrophilic, so the stability as well as the droplet diameters were both affected. The emulsions stabilized with mCNC-propyl$_{290}$-CO$_2$H$_{230}$ were not stable, as can be seen from the picture taken 2 hours after the emulsions had been made (FIG. 16). And emulsions with droplet diameters less than 600 nm could only be stabilized with more hydrophobic CNCs (mCNC-amyl$_{300}$-CO$_2$H$_{220}$, mCNC-hexyl$_{320}$-CO$_2$H$_{200}$ and mCNC-heptyl$_{315}$-CO$_2$H$_{205}$).

Hydrophobic functionalized MxG-CNCs were also studied here, and the DLS results of the emulsion sizes with 35 wt % acrylate monomer mixtures stabilized by MxG-CNC-hexyl$_{420}$-CO$_2$H$_{370}$ and MxG-CNC-heptyl$_{455}$-CO$_2$H$_{335}$ were summarized in Table 1. It is interesting to find out by using hydrophobic functionalized MxG-CNCs, the sizes of the droplets decrease to below 300 nm compared to mCNCs (minimum size ~600 nm). And more interestingly, when the percentage of acrylate monomer mixtures increased to 40 wt %, or even 45 wt %, stable emulsions could be formed with droplet diameters still below 300 nm using MxG-CNC-hexyl$_{420}$-CO$_2$H$_{370s}$. The functionalized MxG-CNCs have higher amount of hydrophobic groups, which will help stabilizing the acrylate monomer mixtures. While the higher amount of residual charge groups also helps their dispensability in water. The combination of the two effects will result in a higher concentration of MxG-CNCs at the oil/water interface, and therefore helps increase the stability and decrease the droplet diameters.

TABLE 1

DLS results of emulsions with 35 wt %-45 wt % of acrylate monomers stabilized with by MxG-CNC-hexyl$_{420}$-CO$_2$H$_{370s}$ and MxG-CNC-heptyl$_{455}$-CO$_2$H$_{335}$.

| | Amount of styrene/acrylate monomers | | |
|---|---|---|---|
| | 35 wt % | 40 wt % | 45 wt % |
| MxG-CNC-hexyl$_{420}$-CO$_2$H$_{370}$ | 276.9 nm | 286.1 ± 21.7 nm | 246.8 ± 21.9 nm |
| MxG-CNC-heptyl$_{455}$-CO$_2$H$_{335}$ | 291.5 nm | 333.6 ± 12.1 nm | 467.0 nm |

A mixture of the above styrene/acrylate monomers with a small percentage of methacylic acid (~1 wt. %) were also used as oil phase, and the droplet sizes of emulsion stabilized by hydrophobically-functionalized mCNCs and MxG-CNCs were summarized in Table 2. The extra negative charges on the surface of the droplets brought up by the acid actually helped stabilized the emulsions. For hexyl and heptyl functionalized mCNCs, emulsions with 35 wt. % oil phase can be stabilized with smaller droplet diameters (~250 nm), and a 45 wt. % acrylate/water emulsions can now be stabilized using functionalized mCNCs. For hexyl and heptyl functionalized MxG-CNCs, the difference of the droplet sizes between monomers with and without methacrylic acid is less notable. Considered the fact that functionalized mCNCs have less residual charge groups than the functionalized MxG-CNCs, therefore the extra charge groups from the acid will have a bigger effect on the mCNCs stabilized emulsions.

TABLE 2

DLS results of emulsions with 35 wt % and 45 wt % of acrylate monomers (with methacrylic acid) stabilized with by mCNC-hexyl$_{320}$-CO$_2$H$_{200}$, mCNC-heptyl$_{315}$-CO$_2$H$_{205}$, MxG-CNC-hexyl$_{420}$-CO$_2$H$_{370s}$ and MxG-CNC-heptyl$_{455}$-CO$_2$H$_{335}$.

| | Amount of styrene/acrylate monomers (with ca. 1 wt. % of oil phase methacrylic acid) | |
|---|---|---|
| | 35 wt % | 45 wt % |
| mCNC-hexyl$_{320}$-CO$_2$H$_{200}$ | 248.3 ± 27.9 nm | 597.7 nm |
| mCNC-heptyl$_{315}$-CO$_2$H$_{205}$ | 251.2 ± 20.5 nm | 633.1 nm |
| MxG-CNC-hexyl$_{420}$-CO$_2$H$_{370}$ | 204.4 ± 6.3 nm | 321.0 ± 18.0 nm |
| MxG-CNC-heptyl$_{455}$-CO$_2$H$_{335}$ | 311.3 ± 92.7 nm | 361.6 ± 26.3 nm |

Figure 17:
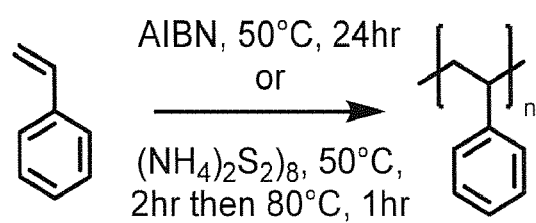
FIG. 17 illustrates synthetic procedures used to access the polystyrene particles.
Figure 18:
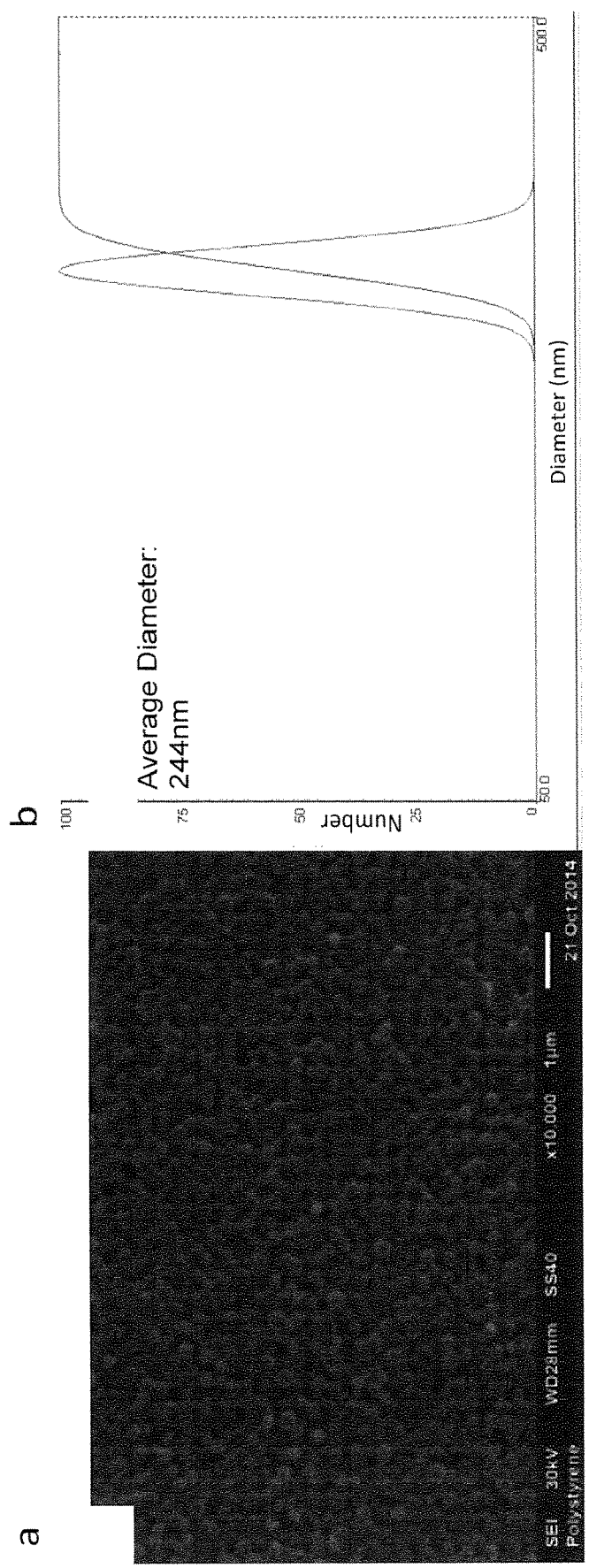
FIG. 18(a)-(b) illustrate a SEM image (a) and DLS graph (b) of the styrene latex solution stabilized by mCNC-hexyl$_{320}$-$CO_2H_{200}$.

Polymerization of Styrene/mCNC Emulsions:

In order to study the latex system, the polymerization conditions of the monomer phase was also investigated (FIG. 17). Initially to polymerize the styrene droplets we followed literature procedures, 1 wt. % AIBN initiators relative to the monomer phase were pre-dissolved in styrene. The emulsions were sonicated using the same conditions to those above, and then the emulsions were diluted to twice the volume with DI water and purged with nitrogen for 10 minutes. Then the glass vials were sealed and put in an oven set at 50° C. for 24 hrs. After polymerization, the solutions were washed with DI water twice and then dried in a vacuum oven at 40° C. for another 24 hrs. The resulting latex particles were washed with water again and centrifuged. The resulting supernatant, which contains approximately 90 wt % of the particles, was a very stable latex, with particles size around 250 nm confirmed by both DLS and SEM (FIG. 18).

Figure 19:
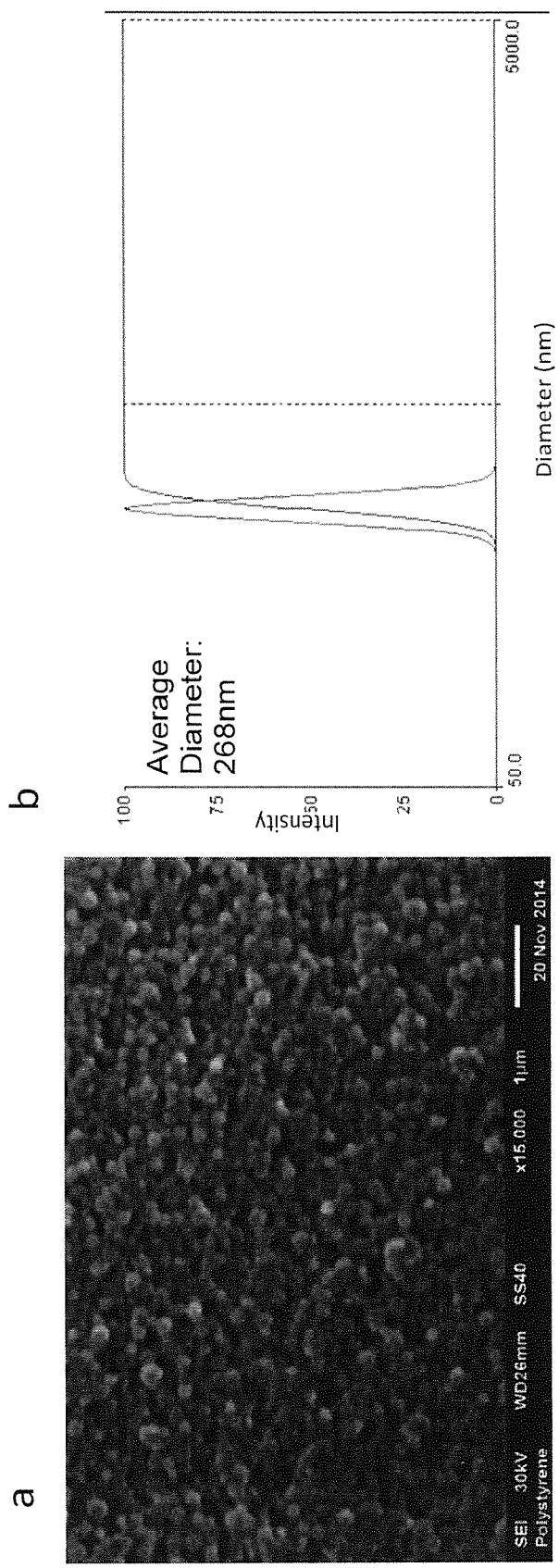
FIG. 19(a)-(b) illustrate a SEM image (a) and DLS graph (b) the polymerized styrene latex stabilized by mCNC-butyl$_{380}$-$CO_2H_{170}$.

In order to polymerize the latex with uniform particle sizes, a refined polymerization technique was used. In the method, a water soluble initiator was used. The emulsion was made using the standard ultrasonication method, and then was purged with nitrogen for 10 min. After that, ammonium persulfate (0.5 wt. % compare to styrene) was dissolved in a small amount of DI water as initiator and then the solution was mix with the emulsions. The emulsions were left to polymerized at 50° C. for 2 hrs and then at 80° C. for another hour. After polymerization, the latexes show good stability and are free of big polystyrene chunks. FIG. 19 shows the SEM and DLS measurement of the polymerized latex stabilized by mCNC-butyl$_{245}$-CO$_2$H$_{250}$ with a droplet size of 268 nm. This method was also reproducible using other mCNCs.

Polymerization of Acrylate Monomers/CNC Emulsions.

Figure 20:
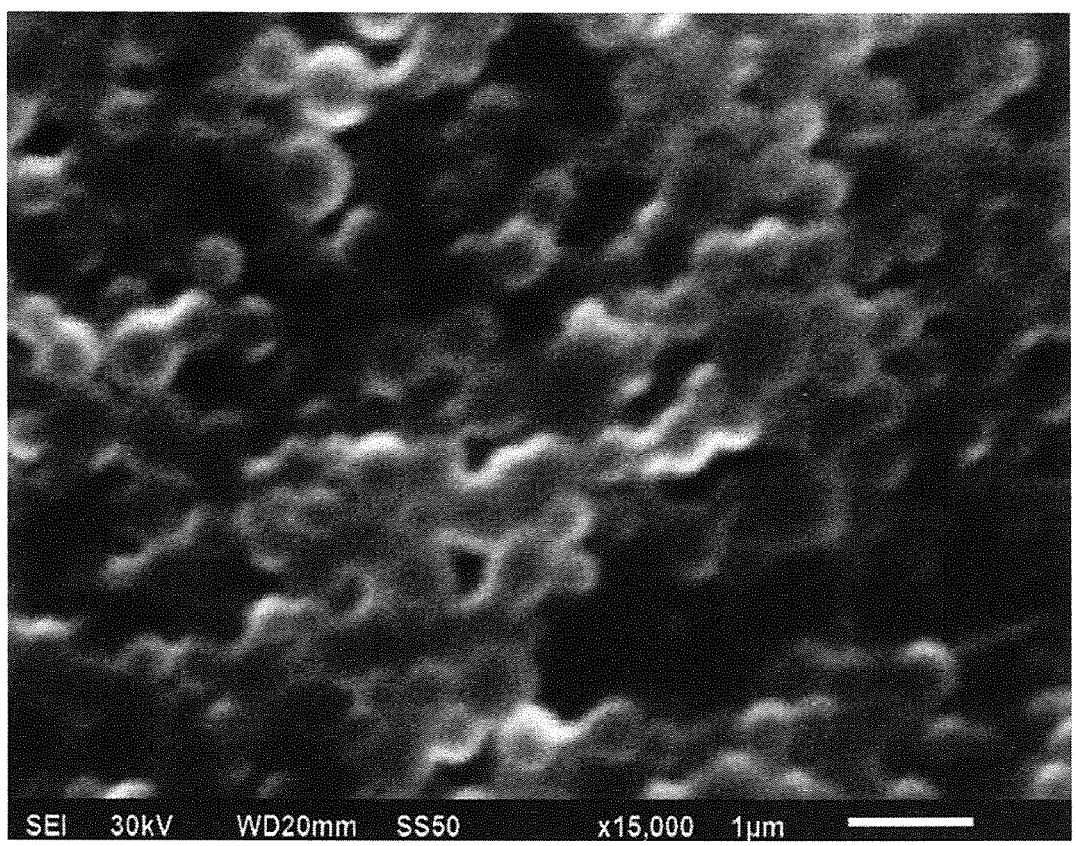
FIG. 20 illustrates a SEM image of the latex polymerized from a 35 wt. % styrene/acrylate monomer emulsions stabilized by mCNC-amyl$_{300}$-$CO_2H_{220}$.
Figure 21:
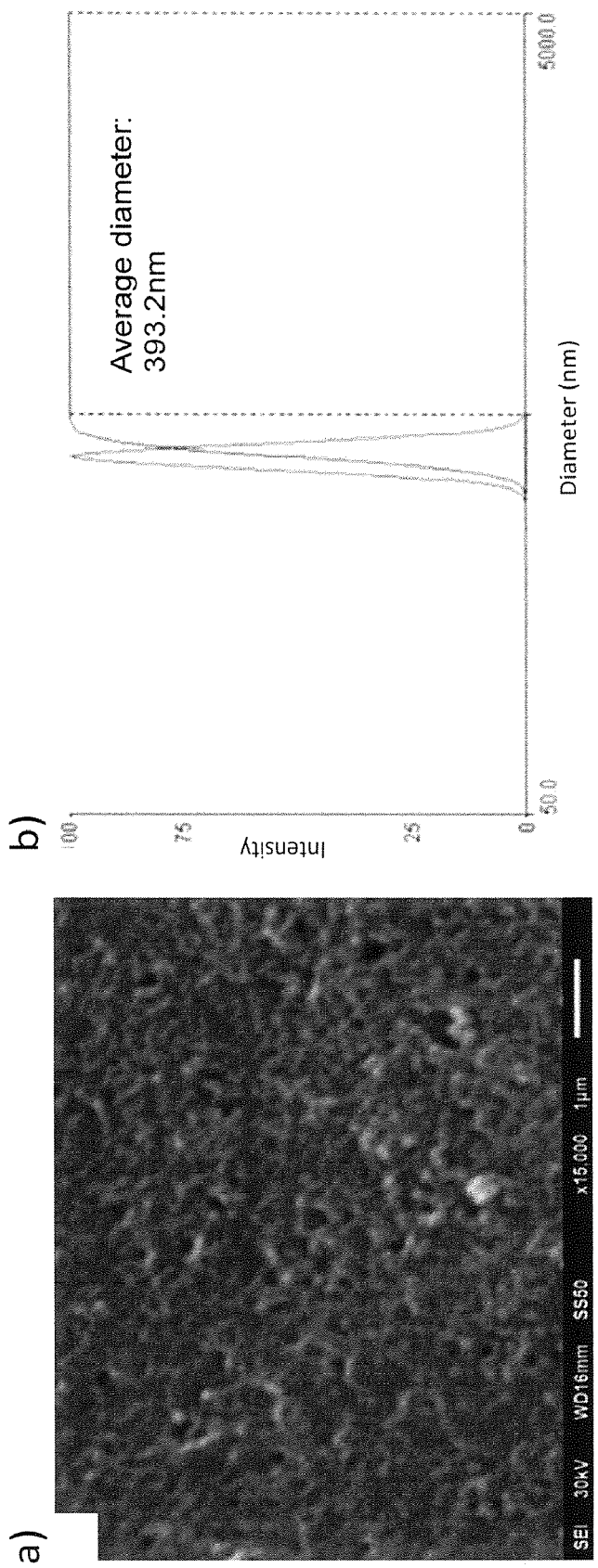
FIG. 21 illustrates a) a SEM image and b) DLS graph of a stable latex polymerized from a 35 wt. % styrene/acrylate monomer emulsion stabilized by MxG-CNC-hexyl$_{420}$-$CO_2H_{370}$.

The emulsions with acrylate monomers as oil phase were also polymerized using the water soluble ammonium persulfate initiator to form latex samples. FIG. 20 shows the first example of a latex polymerized from a 35 wt % acrylate monomer emulsions stabilized by mCNC-amyl$_{300}$-CO$_2$H$_{220}$. The acrylate monomer mixture has a T$_g$ close to room temperature, so the particles look unclear under SEM, but the size of these latex particles are consist with the DLS result of the emulsion (561 nm). In the second example, a stable latex was polymerized from a 35 wt % acrylate monomer emulsions stabilized by MxG-CNC-hexyl$_{420}$-CO$_2$H$_{370}$. It is difficult to see the particles from the SEM (FIG. 19, a), but the DLS results (FIG. 19, b) of the latex gives an average diameter of 393 nm, which is only slightly bigger than the diameter of the emulsions (277 nm). Emulsions stabilized with other functionalized mCNCs and MxG-CNCs could also be polymerized to form stable latex.

Summarizing the disclosure above, stable, nano-sized emulsions having nano-sized droplets that are less than 600 nm in diameter are disclosed incorporating functionalized cellulose nanocrystals as a surfactant. The size of the emulsion droplets and stability can be controlled by selecting the type and amount of functionalization on the cellulose nanocrystals and also the amount of the functionalized nanocrystals utilized. Various organic, non-water soluble molecules or monomers and mixtures thereof can be utilized as the oil phase. Polymerization of the nano-emulsions has been performed, resulting in nano-latexes. Nonlimiting examples of nano-emulsions and nano-latexes have been illustrated with various molecules or monomers, and combinations of molecules or monomers.

In accordance with the patent statutes, the best mode and preferred embodiment have been set forth; the scope of the invention is not limited thereto.

What is claimed is:

1. A nano-emulsion composition comprising:
   water, one or more monomers, and a sufficient amount of a surfactant consisting of functionalized cellulose nanocrystals that stabilizes the composition,
   wherein the functionalized cellulose nanocrystals include both 1) charged groups that are carboxylic acid groups, sulfonate groups, phosphate groups, or a combination thereof and 2) hydrophobic groups that are alkyl groups, allyl groups, aryl groups, or a combination thereof,
   wherein the composition has an emulsion droplet size of greater than 0 nm and less than 600 nm in diameter, and
   wherein said one or more monomers are one or more aromatic vinyl monomers, one or more vinyl monomers, one or more (meth)acrylate monomers wherein said "meth" group can be present or absent, one or more diene monomers, or any combination thereof.

2. The nano-emulsion composition of claim 1, wherein the amount of said functionalized cellulose nanocrystals is from about 0.1 to about 2.0% by weight based upon the total weight of the one or more monomers, the water, and the functionalized cellulose nanocrystals of said nano-emulsion composition; and wherein the amount of said one or more monomers is from about 20 to about 60% by weight based upon the total weight of the one or more monomers, the water, and the functionalized cellulose nanocrystals of said nano-emulsion composition.

3. The nano-emulsion composition of claim 2, wherein said droplet size is from about 200 to about 500 nm; and wherein said functionalized cellulose nanocrystals are isolated from a plant, a marine animal, algae, bacteria, fungi, or any combination thereof.

4. The nano-emulsion composition of claim 3, wherein said droplet size is from about 250 to about 400 nm; wherein the amount of said functionalized cellulose nanocrystals is from about 0.5 to about 1.5% by weight based upon the total weight of the one or more monomers, the water, and the functionalized cellulose nanocrystals of said nano-emulsion composition.

5. A nano-latex composition derived from polymerizing the monomers of claim 1.

6. A nano-latex composition derived from polymerizing the monomers of claim 4.

7. A method for preparing the nano-emulsion composition according to claim 1, comprising the steps of combining the water, the one or more monomers and a sufficient amount of the functionalized cellulose nanocrystals to stabilize the composition; and
   mixing the composition to produce a composition having an emulsion droplet size of greater than 0 nm and less than 600 nm in diameter.

8. The method of claim 7, wherein said droplet size is from about 200 to about 500 nm; and wherein the amount of the said one or monomers is from about 20 to about 60% by weight based upon the total weight of the one or more monomers, the water, and the functionalized cellulose nanocrystals of said nano-emulsion composition.

9. The method of claim 8, wherein said functionalized cellulose nanocrystal is isolated from a plant, a marine animal, algae, bacteria, fungi, or any combination thereof, and wherein the amount of said functionalized cellulose nanocrystals is from about 0.1 to about 2.0% by weight based upon the total weight of the one or more monomers, the water, and the functionalized cellulose nanocrystals of said nano-emulsion composition.

10. The method of claim 9, wherein the amount of said one or more monomers is from about 30 to about 50% by weight based upon the total weight of the one or more monomers, the water, and the functionalized cellulose nanocrystals of said nano-emulsion composition; and wherein the amount of said functionalized cellulose nanocrystals is from about 0.5 to about 1.5% by weight based upon the total weight of the one or more monomers, the water, and the functionalized cellulose nanocrystals of said nano-emulsion composition.

11. The method of claim 10, wherein said droplet size is from about 250 to about 400 nm; and wherein the amount of said one or more monomers is from about 35 to about 45% by weight based upon the total weight of the one or more monomers, the water, and the functionalized cellulose nanocrystals of said nano-emulsion composition.

12. The method of claim 7, including polymerizing said one or more monomers to produce a nano-latex composition.

\* \* \* \* \*